(12) United States Patent
Poliashenko et al.

(10) Patent No.: US 10,530,812 B2
(45) Date of Patent: Jan. 7, 2020

(54) METHODS AND APPARATUSES FOR PROVIDING CONFIGURABLE SECURITY MODELS

(71) Applicant: Hyland Software, Inc., Westlake, OH (US)

(72) Inventors: Yana Poliashenko, Alpharetta, GA (US); Latonia M. Howard, Stone Mountain, GA (US)

(73) Assignee: HYLAND SOFTWARE, INC., Westlake, OH (US)

( * ) Notice: Subject to any disclaimer, the term of this patent is extended or adjusted under 35 U.S.C. 154(b) by 269 days.

(21) Appl. No.: 15/086,495

(22) Filed: Mar. 31, 2016

(65) Prior Publication Data

US 2017/0289196 A1    Oct. 5, 2017

(51) Int. Cl.
*G06F 17/00*    (2019.01)
*H04L 29/06*    (2006.01)

(52) U.S. Cl.
CPC .............. *H04L 63/20* (2013.01); *H04L 63/08* (2013.01); *H04L 63/10* (2013.01)

(58) Field of Classification Search
CPC .......... H04L 63/20; H04L 63/10; H04L 63/08
See application file for complete search history.

(56) References Cited

U.S. PATENT DOCUMENTS

| | | | |
|---|---|---|---|
| 7,106,845 B1 | 9/2006 | Zhuk et al. | |
| 7,712,126 B2 | 5/2010 | Andersson et al. | |
| 8,621,553 B2 | 12/2013 | Syed et al. | |
| 9,356,968 B1* | 5/2016 | Dotan | H04L 63/20 |
| 2005/0081055 A1* | 4/2005 | Patrick | G06F 21/6218 726/26 |
| 2005/0125687 A1* | 6/2005 | Townsend | G06F 21/55 726/26 |
| 2005/0273613 A1 | 12/2005 | Denmark et al. | |
| 2015/0092222 A1* | 4/2015 | Yasukawa | H04N 1/44 358/1.14 |

FOREIGN PATENT DOCUMENTS

WO    WO 2015/005765 A2    1/2015

* cited by examiner

*Primary Examiner* — Trong H Nguyen
*Assistant Examiner* — Amie C. Lin
(74) *Attorney, Agent, or Firm* — Medley, Behrens & Lewis, LLC

(57) ABSTRACT

A method, apparatus and computer program product provide an application server implementing configurable security models. An example of the method includes receiving a first access request from a first client application, determining a first client identifier for the first client application based at least in part on the first access request, using the first client identifier to identify one or more first security models associated with the first client application from a database, the database comprising a plurality of client identifiers and a plurality of indications of security models associated with each of the plurality of client identifiers, executing an application instance providing functionality in accordance with the one or more first security models, and processing the first access request using the application instance.

20 Claims, 4 Drawing Sheets

METHODS AND APPARATUSES FOR PROVIDING CONFIGURABLE SECURITY MODELS

TECHNOLOGICAL FIELD

Example embodiments of the present invention relate generally to methods, systems, and computer readable storage media for implementing network security models and, more particularly, to methods, systems, and computer readable media for providing configurable security models.

BACKGROUND

The need to provide secure computing environments is one of the most difficult challenges presently facing information technology professionals. The damage caused by security breaches to enterprise computing platforms may number in the millions of dollars, depending upon the severity of the breach and the type of data accessed. To address these concerns, software developers engage in a constant battle against malicious users to improve security protocols and address security flaws as they are uncovered. As a result of the race between security professionals and malicious users, it is common for new security protocols to be developed and updated to address flaws and to provide improved security functionality.

As these security protocols are updated to fix vulnerabilities and to provide increased functionality, it may be necessary to update both a client and a server for applications that are remotely hosted due to the need to ensure compatibility between the security protocols used by the client and server. However, in some scenarios it may not be practical to update all clients at the same time as the server is updated. For example, multiple different users may operate clients at different facilities using a single central server, and it may not be possible to coordinate a simultaneous rollout of an updated client. In such a case, clients that have not yet updated may not be able to connect to the updated server, resulting in downtime until those clients receive the update. In other cases, different clients may have different security requirements, but tight coupling between clients and the server may prevent the implementation of different security models by clients using the same server.

As another example, content management systems exist that receive content items from a variety of external systems. In order to ensure the integrity and security of received content, these content management systems may require the external systems to implement particular security models. However, in order to update or change the security model utilized by the content management system, each separate external system must also be updated to reflect any changes made to security model employed by the content management system. This may require updates or changes to the content management system to be delayed until all client systems are configured to be compatible with a new release that has changes that impact the security model.

Through applied effort, ingenuity, and innovation, the inventors have solved many of these identified problems by developing a technical solution that is embodied by the present invention, which is described in detail below.

BRIEF SUMMARY

Methods, apparatuses and computer program products are therefore provided according to example embodiments of the present invention in order to provide configurable security models for use in a client/server architecture. Embodiments provide an interface layer component of an application server that receives an identifier from a client, and determines which security model is associated with that particular client. The determined security model and client identifier are used to determine particular parameters for the determined security model. A connection is then established between the client and the application server using the security model configured according to the security model parameters.

An example of an embodiment of a method for implementing an application server supporting configurable security models includes processing a first access request from a first client application, determining a first client identifier for the first client application based at least in part on the first access request, identifying a first security model associated with the first client application from a database using the first client identifier, the database comprising a plurality of client identifiers and a plurality of indications of security models, each of the security models associated with at least one of the plurality of client identifiers, executing an application instance providing functionality in accordance with the first security model, and processing the first access request using the application instance.

In some embodiments, the method may include determining one or more parameters associated with the first security model. The application instance may further implement the one or more parameters. The one or more parameters may be further associated with the particular client application. The one or more parameters may define at least one of a public key, a private key, a hash salt value, or an order of authentication processes. The method may include receiving a second access request from a second client application, determining a second client identifier for the second client application based at least in part on the second access request, identifying a second security model associated with the second client application from the database using the second client identifier, the second security model being different from the first security model, and processing the second access request using an application instance providing functionality in accordance with the second security model. The application instance that provides functionality in accordance with the second security model may be different from the application instance providing functionality in accordance with the first security model. The second client application may implement a previous version of a security model implemented by the first client application. The one or more security models may define at least one of an encryption algorithm, an availability of a single sign-on operation, or a hash value.

An example of an embodiment of an apparatus for implementing an application server supporting configurable security models includes a processor and a memory. The memory stores instructions that, when executed by the processor configure the apparatus to process a first access request from a first client application, determine a first client identifier for the first client application based at least in part on the first access request, identify a first security model associated with the first client application from a database using the first client identifier, the database comprising a plurality of client identifiers and a plurality of indications of security models, each of the security models associated with at least one of the plurality of client identifiers, execute an application instance providing functionality in accordance with the first security models, and process the first access request using the application instance.

In some embodiments, the processor may further configure the apparatus to determine one or more parameters associated with the first security model. The application instance may further implement the one or more parameters. The one or more parameters may be further associated with the particular client application. The one or more parameters may define at least one of a public key, a private key, a hash salt value, or an order of authentication processes. The processor may further configure the apparatus to receive a second access request from a second client application, determine a second client identifier for the second client application based at least in part on the second access request, identify a second security model associated with the second client application from the database using the second client identifier, the second security model being different from the first security model, and process the second access request using an application instance providing functionality in accordance with the second security model. The application instance providing functionality in accordance with the second security model may be different from the application instance providing functionality in accordance with the first security model. The second client application may implement a previous version of a security model implemented by the first client application. The one or more security models may define at least one of an encryption algorithm, an availability of a single sign-on operation, or a hash value.

An example of an embodiment of a non-transitory computer readable storage medium includes instructions that, when executed on a processor, cause the processor to implement a system for providing configurable security models. The instructions configure the processor to process a first access request from a first client application, determine a first client identifier for the first client application based at least in part on the first access request, identify a first security model associated with the first client application from a database using the first client identifier, the database comprising a plurality of client identifiers and a plurality of indications of security models, each of the security models associated with at least one of the plurality of client identifiers, execute an application instance providing functionality in accordance with the first security models, and process the first access request using the application instance.

In some embodiments, the instructions may further configure the processor to determine one or more parameters associated with the first security model. The application instance may further implement the one or more parameters. The one or more parameters may be further associated with the particular client application. The instructions may further configure the processor to receive a second access request from a second client application, determine a second client identifier for the second client application based at least in part on the second access request, identify a second security model associated with the second client application from the database using the second client identifier, the second security model being different from the first security model, and process the second access request using an application instance providing functionality in accordance with the second security model.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Figure 1:
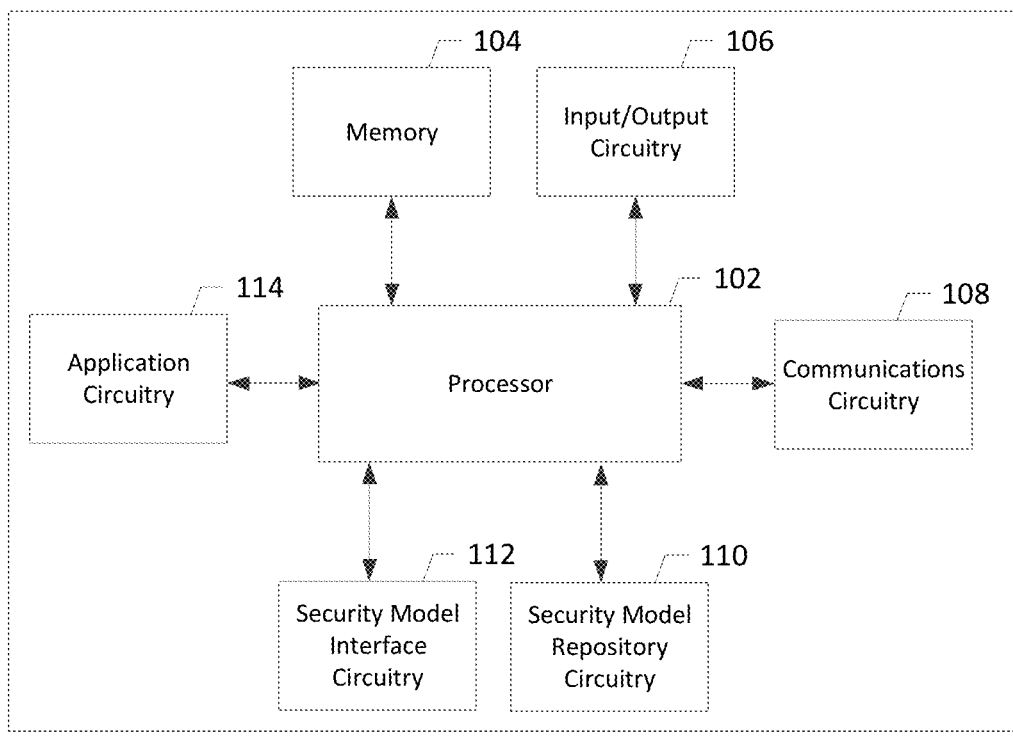
Figure 2:
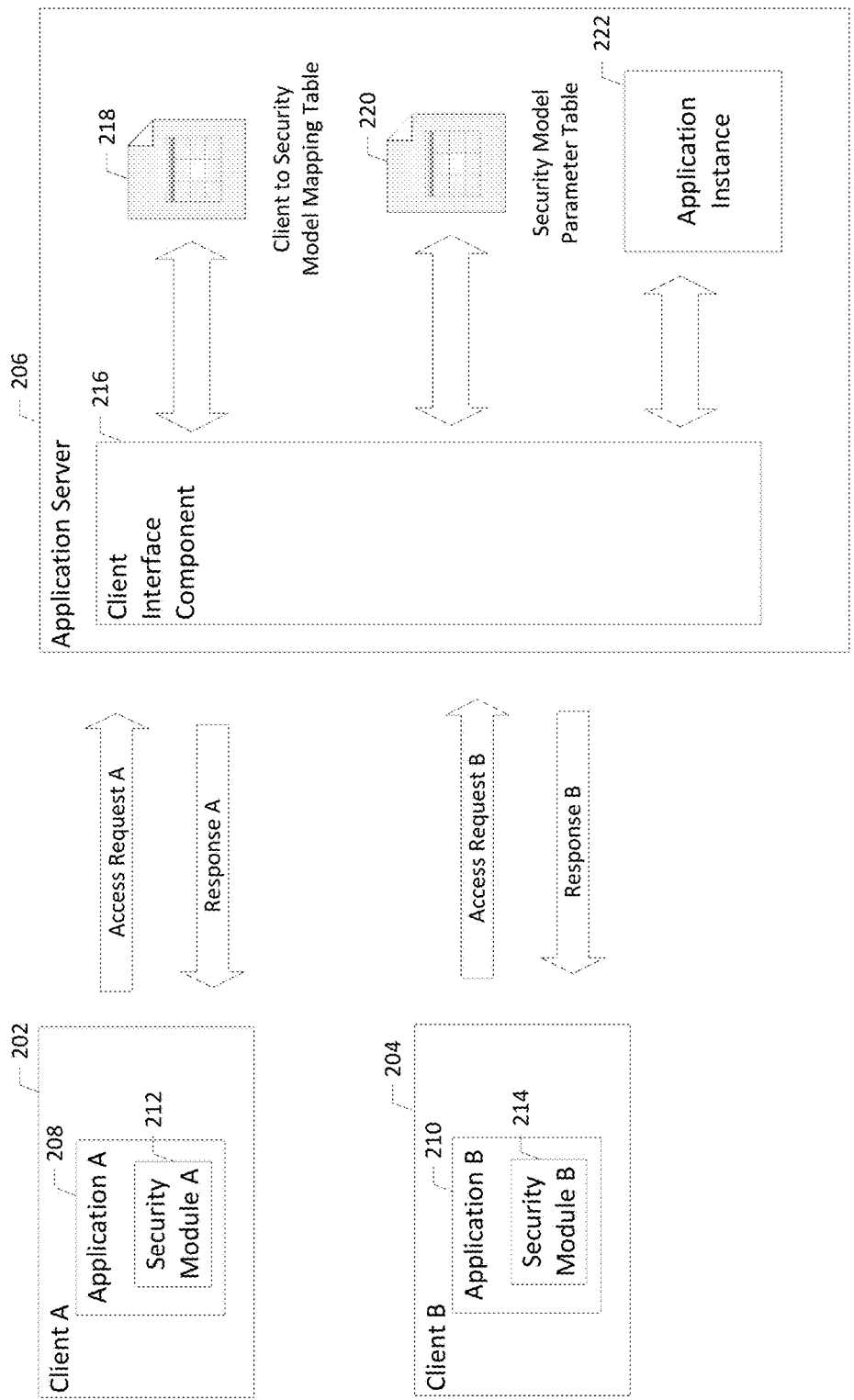
Figure 3:
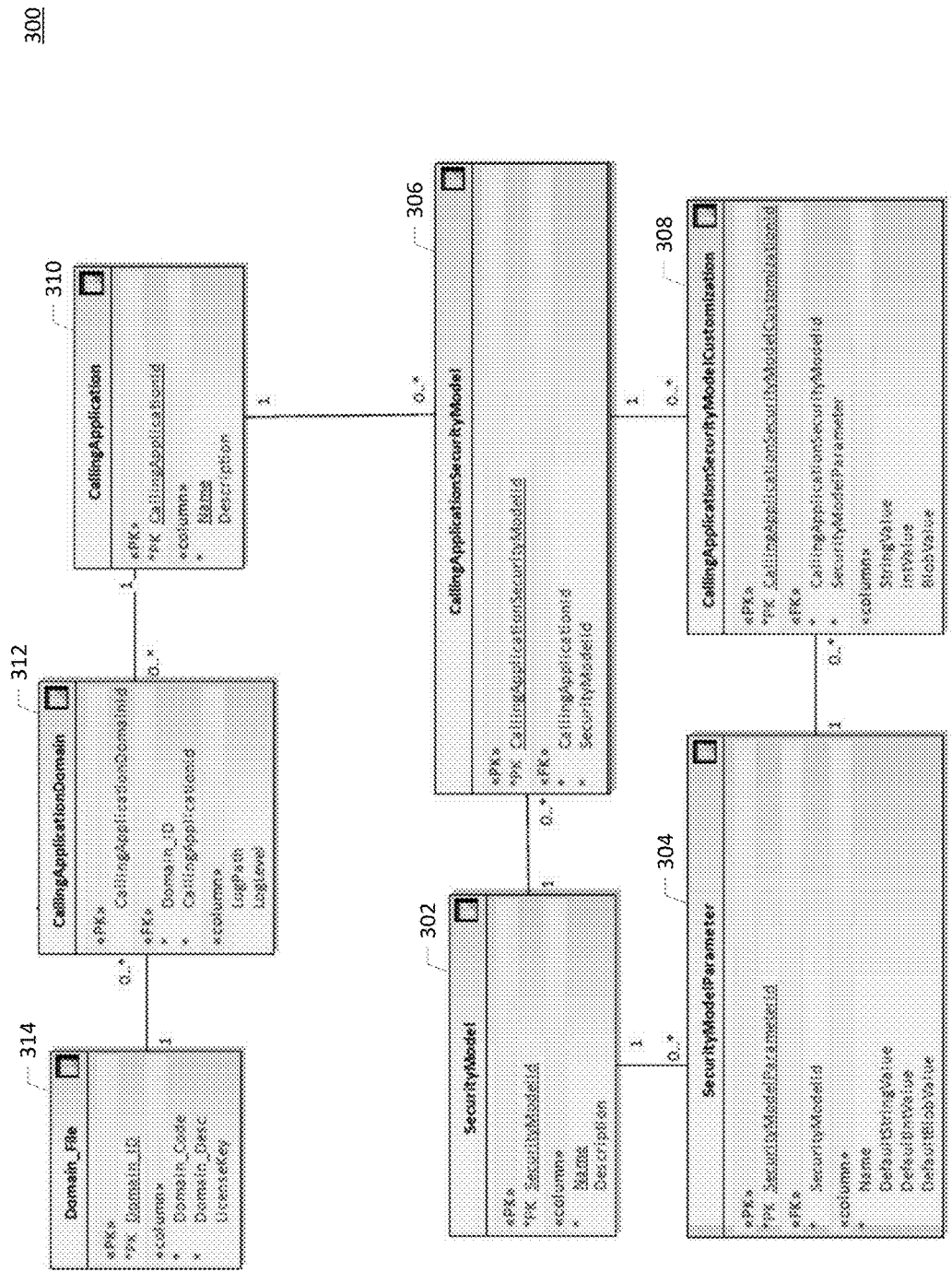
Figure 4:
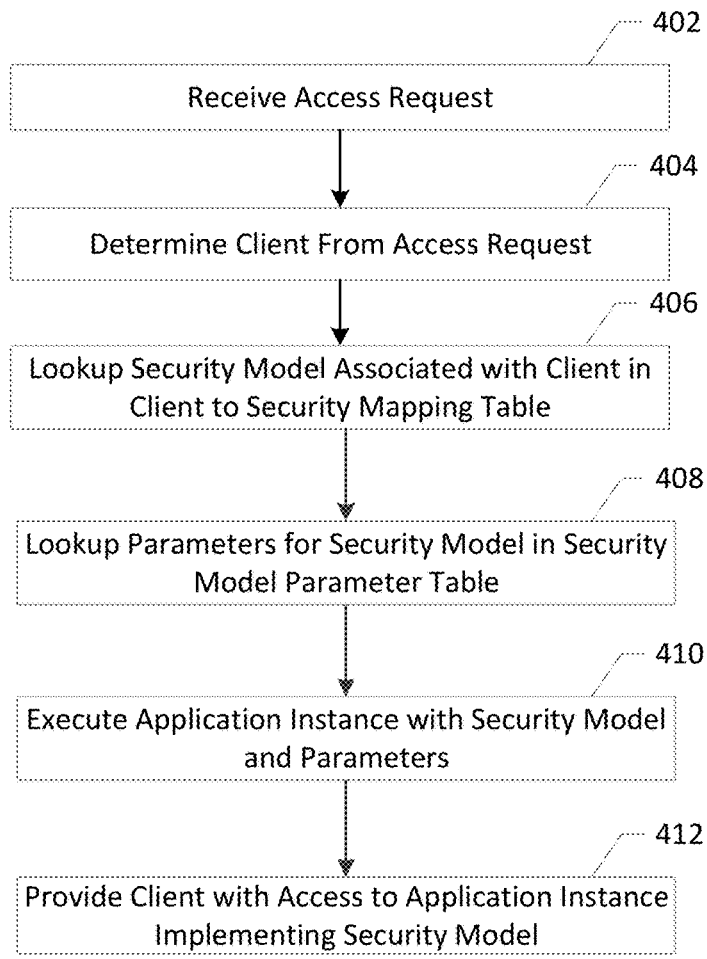

Having thus described certain embodiments of the invention in general terms, reference will now be made to the accompanying drawings, which are not necessarily drawn to scale, and wherein:

FIG. 1 is a block diagram of an apparatus for providing configurable security models in accordance with some embodiments of the present invention;

FIG. 2 is a block diagram of a data flow between logical components of a client/server architecture for providing configurable security models in accordance with some embodiments of the present invention;

FIG. 3 is an illustration of a domain model of data structures for providing configurable security models in accordance with some embodiments of the present invention; and FIG. 4 is an illustration depicting a flow diagram of a process for implementing configurable security models in accordance with some embodiments of the present invention.

DETAILED DESCRIPTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Introduction and Definitions

A method, apparatus and computer program product are provided in accordance with example embodiments of the present invention to provide for configurable security models for applications executing in a client/server architecture in a networked computing environment. As noted above, the inventors have identified that present systems for providing network security are inadequate for many use cases due to tight coupling between clients and applications executing on an application server. To address these problems, the inventors have developed a system that includes a flexible, configurable system for implementing security models that allows for multiple different security models to be implemented by an application server such that security functionality may be added, modified, or configured without disabling the ability of other applications to utilize the application server. Embodiments include the use of a database of security models associated with particular clients and a database of parameters for those security models.

In addition to developing systems allowing for dynamic switching of security models, the inventors have also developed systems that allow for dynamic reconfiguration of security models. For example, embodiments provide the ability to change security model parameters such as changing hashing algorithms, modifying salt values, changing public/private key values, altering the ordering of authentication processes, or the like.

For the purposes of this disclosure, the term "security model" refers to a software application feature or set of features that implement one or more components of a security policy. For example, the term should be understood to include encryption algorithms, hashing techniques, authentication techniques, communication sequencing, handshake information, and the like. The term should also be understood to include whether or not particular features are implemented. For example, whether the application server supports a "single sign on" login system, the use of a directory server, or the like. In some cases, a given security model may specify a plurality of parameters for communications between a client and server. For example, a given security model may specify a first encryption algorithm for a handshake process and a second encryption algorithm for after the handshake process has occurred, a hashing algorithm for parts of a secure token and/or a password, and the use of an Active Directory-based authentication. Another security model might use one hashing algorithm for a secure token hash, and no encryption algorithm.

Exemplary Client Apparatus

FIG. 1 illustrates a block diagram of an apparatus 100 in accordance with some example embodiments. The apparatus 100 may be any computing device capable of implementing configurable security models as described herein. For example, the apparatus 100 may be implemented as an application server that serves one or more client devices. The apparatus implements configurable security models by identifying the security models that apply to a particular client application accessing the application server and ensuring that the interaction between the apparatus 100 and that client application are performed according to the security model. The apparatus 100 may also be configured to execute security operations according to the security models, such as by providing authentication and encryption functionality.

The apparatus 100 may be implemented as a standalone or rack-mounted server, a desktop computer, a laptop computer, a personal digital assistant, a tablet computer, a netbook computer, a mobile device, or the like. Accordingly, it will be appreciated that the apparatus 100 may comprise devices, hardware, and the like configured to implement and/or otherwise support implementation of various example embodiments described herein.

It should be noted that the components, devices or elements illustrated in and described with respect to FIG. 1 below may not be mandatory and thus some may be omitted in certain embodiments. Additionally, some embodiments may include further or different components, devices or elements beyond those illustrated in and described with respect to FIG. 1.

As illustrated in FIG. 1, an apparatus 100 may include a processor 102, a memory 104, input/output circuitry 106, communications circuitry 108, security model repository circuitry 110, security model interface circuitry 112, and application circuitry 114. The apparatus 100 may be configured to execute the operations described below with respect to FIGS. 2-4. Although these components 102-114 are described with respect to functional limitations, it should be understood that the particular implementations necessarily include the use of particular hardware. It should also be understood that certain of these components 102-114 may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, "circuitry" includes processing circuitry, storage media, network interfaces, input/output devices, and/or the like. In some embodiments, other elements of the apparatus 100 may provide or supplement the functionality of particular circuitry. For example, the processor 102 may provide processing functionality, the memory 104 may provide storage functionality, the communications circuitry 108 may provide network interface functionality, and the like, such that each of the circuitries may be formed by other circuitry components of the apparatus 100.

In some embodiments, the processor 102 (and/or co-processor or any other processing circuitry assisting or otherwise associated with the processor) may be in communication with the memory 104 via a bus for passing information among components of the apparatus. The memory 104 may be non-transitory and may include, for example, one or more volatile and/or non-volatile memories. In other words, for example, the memory may be an electronic storage device (e.g., a computer readable storage medium). The memory 104 may be configured to store information, data, content, applications, instructions, tables, data structures, or the like, for enabling the apparatus to carry out various functions in accordance with example embodiments of the present invention.

The processor 102 may include various processing devices and may, for example, include one or more processing devices configured to perform independently from one another. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 102 may be configured to execute instructions stored in the memory 104 or otherwise accessible to the processor. Alternatively or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present invention while configured accordingly. Alternatively, as another example, when the processor is embodied as an executor of software instructions, and the instructions may specifically configure the processor to perform the algorithms and/or operations described herein when the instructions are executed.

In some embodiments, the apparatus 100 may include input/output circuitry 106 that may, in turn, be in communication with processor 102 to provide output to the user and, in some embodiments, to receive an indication of a user input. The input/output circuitry 106 may comprise a user interface and may include a display and may comprise a web user interface, a mobile application, a client device, a kiosk, or the like. In some embodiments, the input/output circuitry 106 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 104, and/or the like).

The communications circuitry 108 may be any means such as a device or circuitry embodied in either hardware or a combination of hardware and software that is configured to receive and/or transmit data from/to a network and/or any other device, circuitry, or module in communication with the apparatus 100. In this regard, the communications circuitry 108 may include, for example, a network interface for enabling communications with a wired or wireless communication network. For example, the communications circuitry 108 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

The security model repository circuitry 110 includes hardware configured to store, provide access to, and execute one or more security models for use with an application server. The security model repository circuitry 110 may thus include processing components such as, for example, the processor 102, and storage components, such as, for example, the memory 104, that serve to implement one or more databases for storing information relating to particular security models. For example, the security model repository circuitry 110 may implement a set of data tables that include entries related to each security model available for use by the apparatus 100, entries related to the configuration for those security models, and references to particular libraries or executable components relating to those security models. An example of a data flow interaction utilizing security model repository circuitry 110 is described further below with respect to FIG. 2. An example of a domain model including data stored and provided by the security model repository circuitry 110 is described further below with respect to FIG. 3.

The security model interface circuitry 112 includes hardware configured to map a particular client access request to a security model or models, and to configure implementation of the security model or models to which the client is mapped. To this end, the security model interface circuitry 112 may include hardware for receiving an access request that identifies a particular client, and accessing a security model repository operated by the security model repository circuitry 110 to determine which security models are associated with the particular client. The security model interface circuitry 112 may further determine a configuration of those security models by accessing a data table including one or more parameters for the security model. Once the particular security model or models and the parameters for those models are determined, the security model interface circuitry 112 may initiate execution of an application that loads and executes those particular security models. The security model interface circuitry 112 includes a processing element, such as the processor 102 to perform these functions. An example of a data flow interaction utilizing security model interface circuitry 112 is described further below with respect to FIG. 2. An example of a domain model that may be utilized by the security model interface circuitry 112 is described further below with respect to FIG. 3.

The application circuitry 114 includes hardware configured to execute one or more applications in support of a client requesting access to an application or applications provided by the apparatus 100. The application circuitry 114 further includes hardware configured to implement one or more security models for the application accessed by the client in accordance with security models identified by the security model interface circuitry 112. For example, the application circuitry 114 may implement various applications that provide server functionality to remote clients, including but not limited to electronic health records applications, document management applications, supply chain management applications, or the like. The application circuitry 114 may further support different client configurations for accessing these applications, including clients configured with different security models. The application circuitry 114 may support implementation of these different security models in a variety of manners. For example, the application circuitry 114 may support a set of command line arguments for execution of an application with a particular security model or with particular security model parameters. Alternatively, the application circuitry 114 may support a plurality of separate executables for each application, with different executables implementing different security models. As yet another example, the application circuitry 114 may support selection of a particular file or files, public/private key, configuration file, such that configuration of the security models of the application is performed by storing a file in a particular location, editing a name of a file, or the like. The application circuitry 114 includes a processing element, such as the processor 102 to implement the functionality of the one or more applications according to the selected security model or models. An example data flow for implementing an application in this manner is described further below with respect to FIG. 2.

As will be appreciated, any such computer program instructions and/or other type of code may be loaded onto a computer, processor or other programmable apparatus's circuitry to produce a machine, such that the computer, processor other programmable circuitry that execute the code on the machine create the means for implementing various functions, including those described herein.

As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Having now described an apparatus configured to implement and/or support implementation of various example embodiments, features of several example embodiments will now be described. It will be appreciated that the following features are non-limiting examples of features provided by some example embodiments. Further, it will be appreciated that embodiments are contemplated within the scope of disclosure that implement various subsets or combinations of the features further described herein. Accordingly, it will be appreciated that some example embodiments may omit one or more of the following features and/or implement variations of one or more of the following features.

Examples of Improved Security Model Configuration Data Flows

The following data flow describes exemplary system interactions for providing configurable security models in accordance with embodiments of the present invention. The data flows illustrate interactions among system components to support interactions among differently configured clients 202, 204 and an application server 206 that implements configurable security models.

In the present example, client A 202 and client B 204 each request access to an application hosted on the application server 206. For the purposes of this example, client A 202 and client B 204 are understood to utilize at least one different security model or security model parameter, though it should be understood that in some embodiments multiple clients may access the application server 206 using the same security model(s) and security model parameters. Client A 202 implements a first application, application A 208. Application A 208 includes a security module A 210, which is understood to implement a first security model. Client B 204 implements a second application, application B 212. Application B 212 includes a security module B 214, which is understood to implement a second security model. As an example, security module A 210 may implement a first encryption algorithm (e.g., MD5), while security module B 214 may implement a second encryption algorithm (e.g., AES). As another example, security module A 210 may implement an authentication flow having one or more steps in a different order than security module B 214. It should also be appreciated that, in some embodiments, the security modules 210, 214 may implement the same security model with different parameters (e.g., different hash salt values).

The client A 202 and the client B 204 may each generate access requests to the server 206 according to their respective security models. Each request generated by each client may be formatted, hashed, or otherwise in compliance with those security models. The application server 206 includes a client interface component 216 configured to receive these requests in each format. In some embodiments each access request may include an unencrypted portion or otherwise security model agnostic portion identifying the particular client that is making the request. In other embodiments, the access request may be entirely encrypted and the client interface component 216 may be configured to decrypt the client identifier. In yet further embodiments, the client interface component 216 may identify the particular client that initiated the request by another mechanism, such as by mapping an Internet Protocol (IP) address that originated the request to a particular client in a hosts table, or the like.

The client interface component 216 identifies the client that made the request. As noted above, the client may be identified by a client identifier embedded within the request or derived from the request. The received or derived client identifier is used in a lookup operation on a client to security model mapping table 218. The client to security model mapping table 218 includes a mechanism for mapping a particular client to one or more security models associated with the particular client. For example, the client to security model mapping table 218 may include a separate row for each client identifier, with columns associated with a particular security model that is applicable to that client. Alternatively, the client to security model mapping table 218 may include a particular bitmask value with bits associated with different security models, strings or tokens associated with particular security models, or the like.

The client interface component 216 determines the particular security model associated with each received access request, and accesses a security model parameter table 220 to determine one or more parameters associated with the security model. For example, a security model associated with the particular client may have an entry within the security model parameter table 220 to identify the particular parameters for implementation of that security model. An example of a domain model for implementing relationships among clients, security models, and parameters is described further below with respect to FIG. 3.

The client interface component 216 may also enable each client that generated an access request to interact with an application instance 222 that implements the particular security model(s) associated with that client. To enable this functionality, the client interface component 216 may cause execution of multiple application instances 222 that each implement security models that apply to the particular client application, while in other embodiments the application instance 222 may be operable to implement each of the different security models depending upon the needs of the client application interacting with the application server 206. In some embodiments, the application instance may implement multiple parameters of a security model, such as where the security model specifies the use of multiple different encryption mechanisms within the same application. In other embodiments, the application server 206 may provide for execution of one or more application instances that implement different security models. In some embodiments, the client interface component 216 may format the received request prior to transmission of the request to the particular application instance. For example, the client interface component 216 may format the request to include a field or header that identifies the client or a particular security model associated with the request to enable more straightforward processing of the request by the application instance 222.

The client interface component 216 receives a response from the application instance 222 to which the request is forwarded for processing. Each response may be provided according to the particular security models implemented by the requesting client. The client interface component 216 or another component of the server 206 may provide these responses back to the clients 202, 204 to facilitate further processing and interaction between each client 202, 204 and the application instance 222 executed by the server 206.

As a particular example of this data flow, embodiments of the present invention contemplate the use of a centralized application (e.g., a content management system) that interacts with multiple external client systems. Each of the external client systems may interact with the centralized application, such as to provide content data to the centralized application or to receive content data from the centralized application. Embodiments of the present invention support a scenario where each of the external client systems may implement a different security model. In the event a change is needed to one or more of the security models, embodiments may make a single change within the security model parameter table 220 to alter the configuration of that security model and any external applications that use that security model. Embodiments may also update particular security models associated with particular external client applications by updating the client to security model mapping table 218. This allows for flexible, efficient management of security models for particular external client applications that may be performed so as only to affect particular external clients implementing a particular security model while leaving other external clients unaffected. As a result, embodiments may be employed to selectively disable or update particular security models in the event of a breach, thereby requiring an update for those client applications which are susceptible to the breach, while still maintaining compatibility with other external clients that are unaffected by the breach.

Exemplary Domain Model for Implementing Configurable Security Models

FIG. 3 illustrates an example of a domain model 300 for implementing a system using configurable security models in accordance with embodiments of the present invention. This domain model 300 illustrates one exemplary set of data structures for storing data related to implementation of such a system. It should be appreciated that this example is not intended to be limiting, and that a variety of different mechanisms for storing data related to implementation of configurable security models might be implemented by embodiments of the present invention.

The domain model 300 includes one or more security model objects 302. The security model objects 302 represent a definition of a particular security model that is usable by an application server for implementing communications between a client and server. The security model object 302 may include a unique identifier and a text name. Each security model object 302 may include one or more security model parameter objects 304. The security model parameter objects 304 may each identify a particular configuration parameter of the security model. It should be understood that each type of security model may have different parameters. As a specific, non-limiting list of examples, the following parameters may be employed as configuration options for different security models: an encryption algorithm used for establishing a handshake, a hashing algorithm used to confirm identity of the client and/or server and/or user credentials, a length of life of temporary and final server sessions, a number of retries when handshake is failing, a number of times a given security token can be reused, whether user credentials are enough or a pin is also required, whether AD credentials are expected, whether an external authentication server should be used for credentials authentication, connection information for an authentication server, whether an "on behalf of" user account should be created, alternatives for how authorization will be used, whether a full secure token has to be always used or a light-weight one is acceptable, whether a refresh token should be used, or how strong of an encryption should be used for each encryption and/or hashing algorithm.

It should also be appreciated that while the instant example domain model 300 describes security models as particular objects for the ease of reference and description, it should also be understood that in some embodiments a logical security model object is actually directly provided by a separately loadable software component (e.g., a library or dynamic linked library object, a Java Archive (JAR) file, or the like). Implementation of a new model may include replacing, swapping, or updating such a separately loadable software component with a new version of the separately loadable software component. In some embodiments, the domain model may be operable to facilitate this process by providing a storage location or a reference to the particular separately loadable software component. In some embodiments, the domain model may be employed to facilitate a discovery operation for new security models. For example, upon initialization, an application may be operable to access the domain model to discover libraries or other files associated with each security model deployed for use by the application.

Each security model object 302 may be associated with one or more calling application security model objects 306. The calling application security model objects 306 represent particular implementation details of the security model for a particular calling application. The implementation details may include one or more security model customization objects 308 that are specific to the implementation of the particular security model on that particular application. For example, a given application may implement a customization that alters the order in which authentication processes occur for certain calling applications (e.g., requesting a physical token prior to a password in some cases), or using a different salt value for password hashes for some calling applications but not others.

It should also be appreciated that by maintaining security model information in a data model such as this, alterations and customizations to security model parameters may be implemented in a flexible, straightforward way. For example, if a private key or set of password hashes is compromised, then changing that data value may be as straightforward as editing a single value for that security model or implementation of that security model for a particular calling application. Application code may be aware of the different parameters that are available for access, so that changing values of existing parameters may be automatically detected and processed by the respective application.

A calling application object 310 may exist for each application that may interact with an application server. The calling application object 310 may be associated with a calling application security model object 306, and multiple calling applications may be associated with the same security model. The calling application object 310 may provide mechanisms for overriding one or more elements of a given security model. The use of a calling application object 310, rather than a direct reference to the security model, may also be employed to reduce the ability of applications to impersonate one another. The association between the calling application and the calling application security model may serve to identify the manner in which the calling application implements the security model. The calling application object 310 may be further associated with a particular calling application domain 312, which may define certain context-based security elements which are separate and distinct from the security model implemented by the particular calling application. Context-based security such as associated with the calling application domain may be implemented by other components of the system related to authorization functionality, which may be implemented separately and distinctly from the activities related to security models as described herein. Similarly, the calling application domain 312 may be associated with an overall domain file 314, which provides a single association for all of the calling application domains 312.

Exemplary Processes for Implementing Configurable Security Models

FIG. 4 is a flow diagram depicting an exemplary process 400 for implementing an application server using configurable security models in accordance with embodiments of the present invention. These processes may be employed by an apparatus, such as the apparatus 100 described above, to perform tasks related to identification of a calling application, determining the security models associated with that calling application, and communicating with the calling application according to the determined security models. As noted above with respect to FIG. 3, this process may further include identifying particular exceptions and/or customizations to the security model for the particular application. In this regard, these processes describe algorithms that are implemented via hardware or software executing on hardware components of an apparatus to implement these tasks and other tasks related to implementation of configurable security models. These algorithms may serve as means for implementing these tasks and other functions as described above and herein.

At action 402, an access request is received by an application server, such as the apparatus 100 described with respect to FIG. 1 or the application server 206 described with respect to FIG. 2. The access request may be received directly or indirectly from a particular client. At action 404, an identifier for that client is determined. As described above, the client may be determined through an encrypted or unencrypted identifier embedded within the message itself, or the client may be determined by the application server based on particular characteristics of the access request (e.g., a source IP address).

At action 406, the process 400 performs a lookup using the determined client to identify the security model associated with the client. At action 408, the identified security model is used as an index to lookup particular parameters associated with the security model. This lookup operation may also include additionally using the client identifier in a lookup of the parameters to identify any customizations performed for use of the particular security model with the particular calling client application.

At action 410, an application instance is executed to process the access request according to the security model and parameters determined at actions 406 and 408. Execution of the application instance may include processing the access request using particular encryption/decryption algorithms, performing authentication in a particular manner (e.g., requesting verification tokens or user account credentials in a particular order), using particular salt values for performing hash operations, requesting information from a directory server as part of a single sign-on operation, or the like. It should be appreciated that in some embodiments, a given application may be capable of executing a variety of different security elements within one security model based on the needs of the calling applications, and that a single server application instance may serve multiple clients that implement different respective security models.

At action 412, the access request is processed to provide the client with access to the particular application instance via the determined security models. Providing access in this regard may also include prompting the calling application for additional information (e.g., additional credentials) in accordance with the security models associated with that application. In this regard, the application server may provide a mechanism whereby multiple different client security model configurations may interact with the single application server.

It will be understood that each element of the flowcharts, and combinations of elements in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory 104 of an apparatus employing an embodiment of the present invention and executed by a processor 102 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method executed by a processor of an apparatus for implementing an application server supporting configurable security models, the method comprising:
   receiving a first access request from a first client application executing on a first client device;

determining a first client identifier for the first client application based at least in part on the first access request;
identifying a first security model associated with the first client application from a database using the first client identifier, the database comprising a plurality of client identifiers and a plurality of indications of security models, each of the security models associated with at least one of the plurality of client identifiers in the database, wherein the first client identifier is associated with the first security model due to the first client application being updated with an update, wherein a second client identifier of a second client application executing on a second client device is associated with a second security model in the database due to the second application failing to be updated with the update;
executing a first application instance providing functionality to the first client application in accordance with the first security model due to the first client application being updated with the update;
processing the first access request using the first application instance;
receiving a second access request from the second client application executing on the second client device;
determining the second client identifier for the second client application based at least in art on the second access request;
identifying the second security model associated with the second client application from the database using the second client identifier, the second security model being different from the first security model;
executing a second application instance providing functionality to the second client application in accordance with the second security model due to the second client application failing to be updated with the update; and
processing the second access request using the second application instance.

2. The method of claim 1, further comprising determining one or more parameters associated with the first security model, wherein the first application instance further implements the one or more parameters.

3. The method of claim 2, wherein the one or more parameters are further associated with the first client application.

4. The method of claim 2, wherein the one or more parameters define at least one of a public key, a private key, a hash salt value, or an order of authentication processes.

5. The method of claim 1, wherein the second application instance providing functionality in accordance with the second security model is different from the first application instance providing functionality in accordance with the first security model.

6. The method of claim 1, wherein the second client application implements a previous version of a security model implemented by the first client application.

7. The method of claim 1, wherein each of the security models define at least one of an encryption algorithm, an availability of a single sign-on operation, or a hash value.

8. The method of claim 1, wherein the first client application and the second client application are electronic health records applications.

9. An apparatus for implementing an application server supporting configurable security models, the apparatus comprising a processor and a memory, the memory storing instructions that, when executed by the processor, configure the apparatus to:
receive a first access request from a first client application executing on a first client device;
determine a first client identifier for the first client application based at least in part on the first access request;
identify a first security model associated with the first client application from a database using the first client identifier, the database comprising a plurality of client identifiers and a plurality of indications of security models, each of the security models associated with at least one of the plurality of client identifiers in the database, wherein the first client identifier is associated with the first security model due to the first client application being updated with an update, wherein a second client identifier of a second client application executing on a second client device is associated with a second security model in the database due to the second application failing to be updated with the update;
execute a first application instance providing functionality to the first client application in accordance with the first security model rather than the second security model due to the first client application being updated with the update;
process the first access request using the first application instance;
receive a second access request from the second client application executing on the second client computing device;
determine the second client identifier for the second client application based at least in part on the second access request;
identify the second security model associated with the second client application from the database using the second client identifier, the second security model being different from the first security model;
execute a second application instance providing functionality to the second client application in accordance with the second security model due to the second client application failing to be updated with the update; and
process the second access request using the second application instance.

10. The apparatus of claim 9, the processor further configuring the apparatus to determine one or more parameters associated with the first security model, wherein the first application instance further implements the one or more parameters.

11. The apparatus of claim 10, wherein the one or more parameters are further associated with the first client application.

12. The apparatus of claim 10, wherein the one or more parameters define at least one of a public key, a private key, a hash salt value, or an order of authentication processes.

13. The apparatus of claim 9, wherein the second application instance providing functionality in accordance with the second security model is different from the first application instance providing functionality in accordance with the first security model.

14. The apparatus of claim 9, wherein the second client application implements a previous version of a security model implemented by the first client application.

15. The apparatus of claim 9, wherein each of the security models define at least one of an encryption algorithm, an availability of a single sign-on operation, or a hash value.

16. The apparatus of claim 9, wherein the first client application and the second client application are electronic health records applications.

17. A non-transitory computer readable storage medium comprising instructions that, when executed on a processor of an apparatus, cause the processor to implement a system for providing configurable security models, the instructions configuring the processor to:

receive a first access request from a first client application executing on a first client device;

determine a first client identifier for the first client application based at least in part on the first access request;

identify a first security model associated with the first client application from a database using the first client identifier, the database comprising a plurality of client identifiers and a plurality of indications of security models, each of the security models associated with at least one of the plurality of client identifiers in the database, wherein the first client identifier is associated with the first security model due to the first client application being updated with an update, wherein a second client identifier of a second client application executing on a second client device is associated with a second security model in the database due to the second client application failing to be updated with the update;

execute a first application instance providing functionality in accordance with the first security model due to the first client application being updated with the update;

process the first access request using the first application instance;

receive a second access request from the second client application executing on the second client computing device;

determine the second client identifier for the second client application based at least in part on the second access request;

identify the second security model associated with the second client application from the database using the second client identifier, the second security model being different from the first security model;

execute a second application instance providing functionality to the second client application in accordance with the second security model due to the second client application failing to be updated with the update; and process the second access request using the second application instance.

18. The computer readable storage medium of claim 17, the instructions further configuring the processor to determine one or more parameters associated with the first security model, wherein the first application instance further implements the one or more parameters.

19. The computer readable storage medium of claim 18, wherein the one or more parameters are further associated with the first client application.

20. The computer readable storage medium of claim 17, wherein the first client application and the second client application are electronic health records applications.

* * * * *